United States Patent
Kim et al.

(10) Patent No.: US 10,348,523 B2
(45) Date of Patent: Jul. 9, 2019

(54) REFERENCE SIGNAL CONFIGURATION METHOD FOR V2V COMMUNICATION IN WIRELESS COMMUNICATION SYSTEM, AND APPARATUS THEREFOR

(71) Applicant: LG ELECTRONICS INC., Seoul (KR)

(72) Inventors: Youngtae Kim, Seoul (KR); Hanbyul Seo, Seoul (KR); Hyukjin Chae, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/735,308

(22) PCT Filed: Jun. 13, 2016

(86) PCT No.: PCT/KR2016/006255
§ 371 (c)(1),
(2) Date: Dec. 11, 2017

(87) PCT Pub. No.: WO2016/200236
PCT Pub. Date: Dec. 15, 2016

(65) Prior Publication Data
US 2018/0176043 A1 Jun. 21, 2018

Related U.S. Application Data

(60) Provisional application No. 62/173,974, filed on Jun. 11, 2015.

(51) Int. Cl.
*H04L 27/26* (2006.01)
*H04L 25/02* (2006.01)
(Continued)

(52) U.S. Cl.
CPC ........ *H04L 25/0224* (2013.01); *H04L 5/0048* (2013.01); *H04L 5/0051* (2013.01);
(Continued)

(58) Field of Classification Search
CPC ............. H04L 25/0224; H04L 27/2613; H04L 5/0048; H04L 27/2675; H04L 5/00;
(Continued)

(56) References Cited

U.S. PATENT DOCUMENTS

| 8,798,012 B2* | 8/2014 | Kazmi | H04B 7/0417 370/336 |
| 2007/0177501 A1* | 8/2007 | Papasakellariou | H04W 24/00 370/229 |

(Continued)

OTHER PUBLICATIONS

RP-150626: 3GPP RAN #68, Jun. 2015, "LTE-based Vehicle to Vehicle Communications," Qualcomm, pp. 1-13.
(Continued)

*Primary Examiner* — Jay P Patel
(74) *Attorney, Agent, or Firm* — Dentons US LLP

(57) ABSTRACT

The present invention relates to a method and an apparatus for receiving a reference signal by a vehicle-to-vehicle (V2V) device for V2V communication in a wireless communication system. Specifically, the present invention comprising the steps of: receiving configuration with respect to one or more reference signals that are shared in a first transmission time interval (TTI) and a second TTI following the first TTI; and receiving the reference signals according to the configuration, wherein the first TTI and the second TTI are composed of orthogonal frequency division multiplexing (OFDM) symbols that are shorter than a subframe, and are configured such that the subframe matches with a symbol boundary.

8 Claims, 24 Drawing Sheets

(51) Int. Cl.
*H04L 5/00* (2006.01)
*H04L 5/16* (2006.01)
*H04W 4/46* (2018.01)
*H04L 27/00* (2006.01)
*G08G 1/00* (2006.01)
*H04W 56/00* (2009.01)

(52) U.S. Cl.
CPC ............ *H04L 5/16* (2013.01); *H04L 27/2602* (2013.01); *H04L 27/2613* (2013.01); *H04L 27/2675* (2013.01); *G08G 1/00* (2013.01); *H04L 5/0007* (2013.01); *H04L 5/0055* (2013.01); *H04L 5/0057* (2013.01); *H04L 27/2656* (2013.01); *H04L 27/2657* (2013.01); *H04L 2027/0026* (2013.01); *H04W 4/46* (2018.02); *H04W 56/0045* (2013.01)

(58) Field of Classification Search
CPC .............. H04L 5/0007; H04L 27/2656; H04L 27/2657; H04L 2027/0026; H04W 4/46
See application file for complete search history.

(56) References Cited

U.S. PATENT DOCUMENTS

| | | |
|---|---|---|
| 2009/0245190 A1 | 10/2009 | Higuchi et al. |
| 2009/0268695 A1* | 10/2009 | Zhao .................... H04L 5/0048 370/336 |
| 2010/0039972 A1* | 2/2010 | Wang ................... H04W 52/12 370/311 |
| 2013/0242744 A1* | 9/2013 | Wigren ................. H04W 24/02 370/236 |
| 2013/0250790 A1 | 9/2013 | Lin et al. |
| 2014/0269520 A1 | 9/2014 | Yi et al. |
| 2014/0293843 A1* | 10/2014 | Papasakellariou .. H04W 72/042 370/280 |
| 2014/0369242 A1 | 12/2014 | Ng et al. |
| 2015/0063493 A1* | 3/2015 | Tie ........................ H04B 1/0483 375/299 |
| 2015/0373736 A1* | 12/2015 | Ji .......................... H04B 7/2621 370/330 |
| 2015/0381331 A1* | 12/2015 | Kim ...................... H04L 5/0048 370/329 |
| 2016/0021658 A1* | 1/2016 | Chen .................. H04W 72/0446 370/252 |
| 2016/0088604 A1* | 3/2016 | Patel .................... H04L 5/0053 370/336 |
| 2016/0099802 A1* | 4/2016 | Noh .................... H04W 72/042 370/277 |
| 2016/0112892 A1* | 4/2016 | Damnjanovic ....... H04W 24/10 370/336 |
| 2016/0197712 A1* | 7/2016 | Sorrentino ............ H04L 5/0051 370/336 |
| 2016/0255611 A1* | 9/2016 | Damnjanovic ..... H04W 72/042 370/330 |
| 2016/0309466 A1* | 10/2016 | Chen .................... H04B 7/2628 |
| 2016/0330011 A1* | 11/2016 | Lee ...................... H04L 5/0066 |
| 2016/0338046 A1* | 11/2016 | Chen .................... H04L 5/0048 |
| 2017/0367058 A1* | 12/2017 | Pelletier ............ H04W 56/0045 |
| 2018/0007673 A1* | 1/2018 | Fwu ....................... H04W 4/70 |
| 2018/0098337 A1* | 4/2018 | Lee ..................... H04W 72/042 |

OTHER PUBLICATIONS

Intel Corporation, "Discussion on D2D Operation Outside of Network Coverage (Mode-2)", 3GPP TSG RAN WG1 Meeting #76bis, Mar. 31-Apr. 4, 2004, R1-141546, XP050787214.
Huawei, HiSilicon, "Motivation for RAN work on V2V in Rel-13", 3GPP TSG RAN Meeting #66, Dec. 8-11, 2014, RP-141918, XP050898625.
Search Report of European Patent Office in Appl'n No. 16807876.4, dated Jan. 30, 2019.

* cited by examiner

FIG. 2
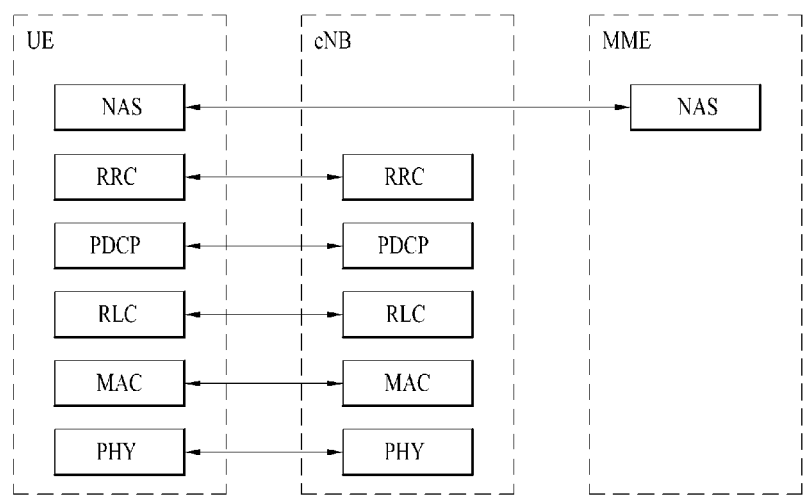
(a) Control-plane protocol stack
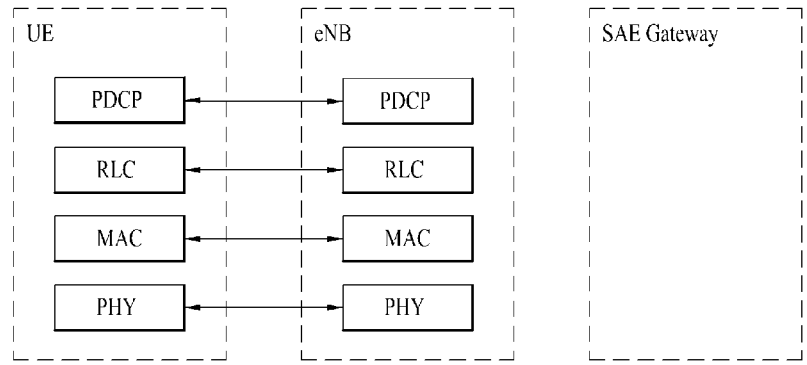
(b) User-plane protocol stack FIG. 8
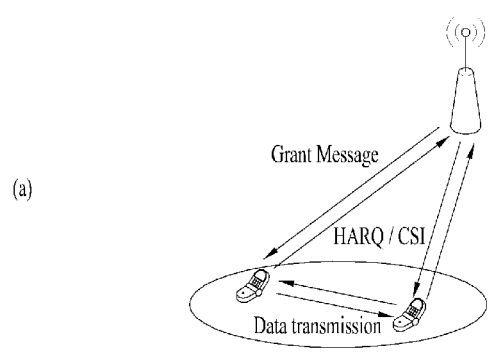
(a)
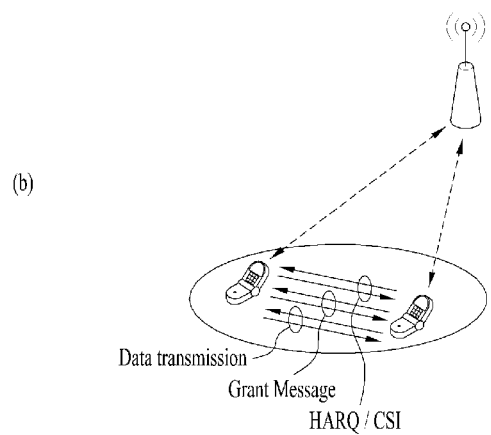
(b)

REFERENCE SIGNAL CONFIGURATION METHOD FOR V2V COMMUNICATION IN WIRELESS COMMUNICATION SYSTEM, AND APPARATUS THEREFOR

This application is a 35 USC § 371 National Stage entry of International Application No. PCT/KR2016/006255 filed on Jun. 13, 2016, and claims priority to U.S. Provisional Application No. 62/173,974 filed on Jun. 11, 2015, all of which are hereby incorporated by reference in their entireties as if fully set forth herein.

TECHNICAL FIELD

The present invention relates to a wireless communication system, and more particularly, to a method for configuring a reference signal for vehicle-to-vehicle (V2V) communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the above discussion, a method for configuring a reference signal for V2V communication in a wireless communication system and apparatus therefor will be proposed.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a method for receiving a reference signal for vehicle-to-vehicle (V2V) communication by a V2V device in a wireless communication system, including: receiving a configuration for at least one reference signal shared between a first transmission time interval (TTI) and a second TTI following the first TTI; and receiving the reference signal according to the configuration. In this case, the first and second TTIs may be composed of orthogonal frequency division multiplexing (OFDM) symbols smaller than a subframe, and symbol boundaries of the first and second TTIs may be configured to match those of the subframe.

Additionally, the first TTI may include a first reference signal, and the second TTI may include second and third reference signals. In this case, the first TTI may be defined to perform channel estimation using the first and second reference signals, and the second TTI may be defined to perform the channel estimation using the second and third reference signals.

Additionally, at least part of an OFDM symbol located at the front of each of the first and second TTIs may be configured for automatic gain control (AGC).

Additionally, at least part of an OFDM symbol located at the end of each of the first and second TTIs may be configured for timing advance (TA).

Additionally, an OFDM symbol next to the shared at least one reference signal may be configured to be empty.

Additionally, the first TTI may include first and second reference signals, and the second TTI may include third and fourth reference signals. In this case, the first TTI may be defined to perform channel estimation using the first, second, and third reference signals, and the second TTI may be defined to perform the channel estimation using the second, third, and fourth reference signals.

Additionally, the shared at least one reference signal may be configured to use different sequences for different V2V devices.

Additionally, the shared at least one reference signal may be generated using an identifier of another V2V device that transmits the reference signal.

In another aspect of the present invention, provided herein is a method for receiving a reference signal for vehicle-to-vehicle (V2V) communication by a V2V device in a wireless communication system, including: receiving a configuration for at least one reference signal shared by a first transmission time interval, a second TTI following the first TTI, and a third TTI following the second TTI; and receiving the reference signal according to the configuration. In this case, the first, second, and third TTIs may be composed of orthogonal frequency division multiplexing (OFDM) symbols smaller than a subframe, and symbol boundaries of the first, second, and third TTIs may be configured to match those of the subframe.

In a further aspect of the present invention, provided herein is a vehicle-to-vehicle (V2V) device for receiving a reference signal for V2V communication in a wireless communication system, including: a radio frequency unit and a processor. In this case, the processor may be configured to receive a configuration for at least one reference signal shared between a first transmission time interval (TTI) and a second TTI following the first TTI and receive the reference signal according to the configuration. In addition, the first and second TTIs may be composed of orthogonal frequency division multiplexing (OFDM) symbols smaller than a subframe, and symbol boundaries of the first and second TTIs may be configured to match those of the subframe.

Advantageous Effects

According to embodiments of the present invention, it is possible to efficiently configure a reference signal for V2V communication in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a UE and E-UTRAN based on 3GPP radio access network standards.

FIG. 8 is a reference diagram for explaining D2D (UE-to-UE) communication.

BEST MODE FOR INVENTION

Figure 1:
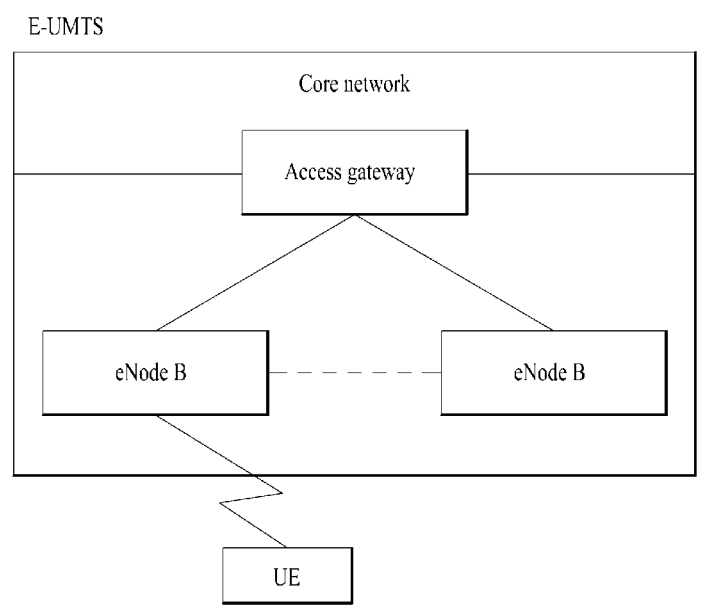
FIG. 1 is a schematic diagram of an E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
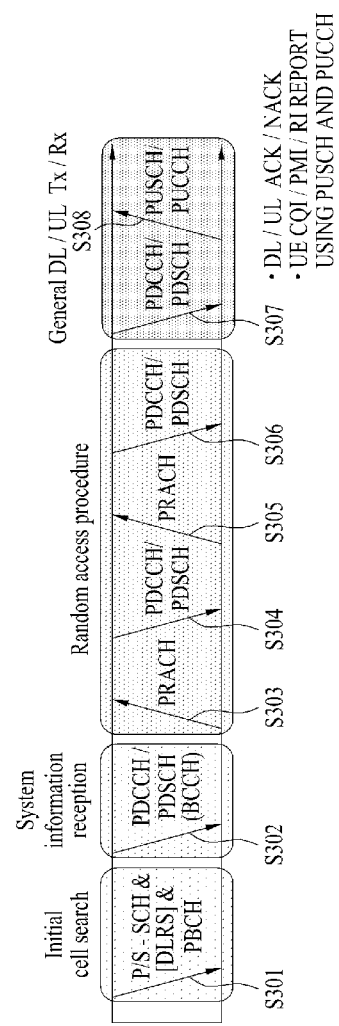
FIG. 3 illustrates physical channels used in the 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
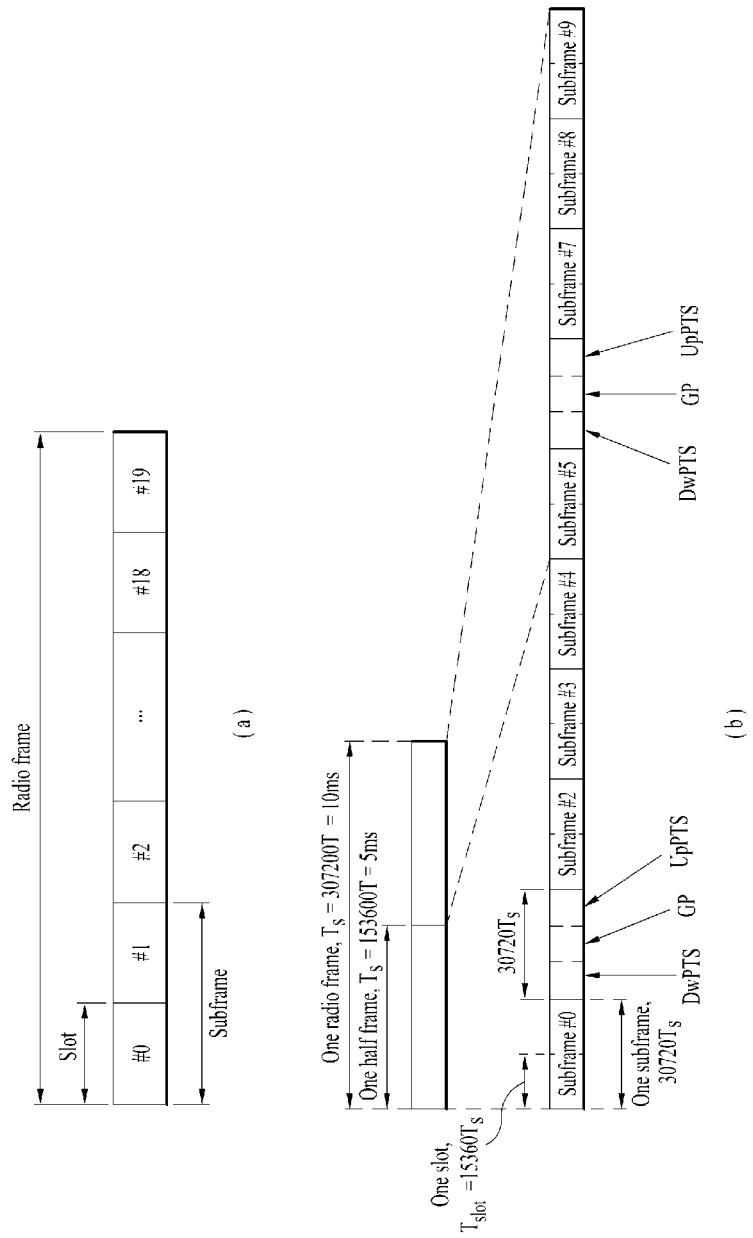
FIG. 4 illustrates a structure of a radio frame used in the LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 sub-frames, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
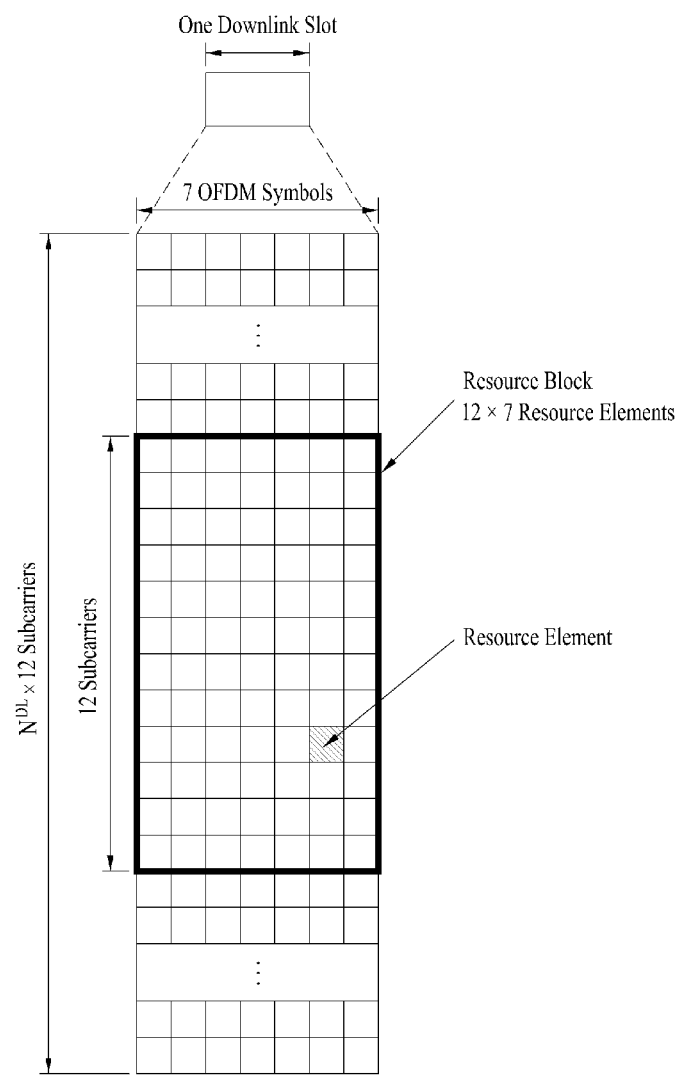
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | included in the DL slot depends on a DL transmission bandwidth configured in a cell.

Figure 6:
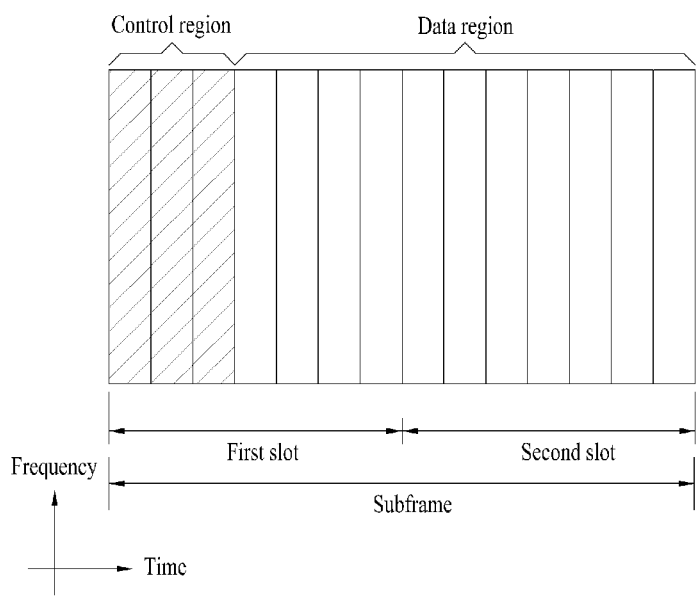
FIG. 6 illustrates a structure of a downlink radio frame used in the LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
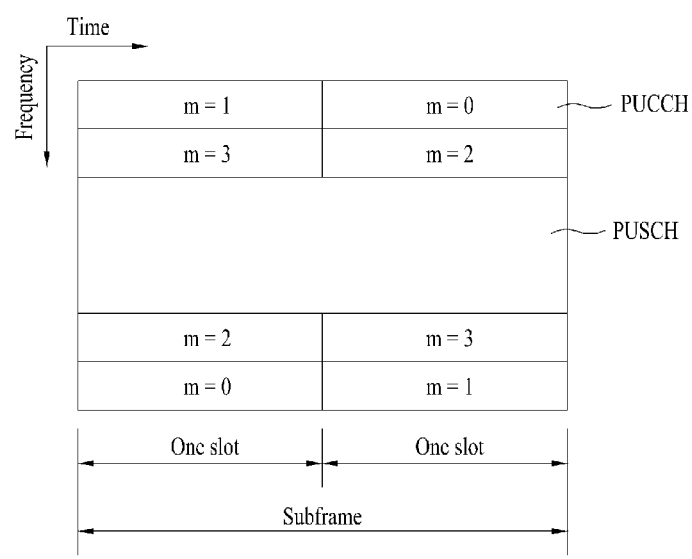
FIG. 7 illustrates a structure of an uplink subframe used in the LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

D2D communication schemes can be mainly divided into a scheme supported by a network/coordination station (e.g., base station) and a scheme not supported by the network/coordination station.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links and transceive data.

Figure 9:
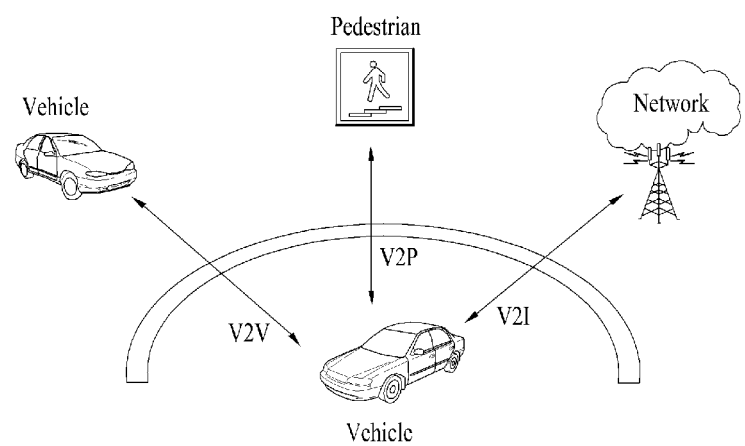
FIG. 9 is a reference diagram for explaining a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop V2V (Vehicleto-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Based on the above discussion, reference signal (RS) design in consideration of a short transmission time interval (TTI) for a vehicle-to-vehicle (V2V) scenario will be described in the present invention. Although the present invention is described based on V2V, the invention can be applied to other scenarios including D2D and the like.

In particular, the present invention will be described on the premise of a short TTI available for V2V. In general, devices have a half-duplex problem. In other words, this could be interpreted to mean that a vehicle cannot receive a signal while transmitting a signal. Similarly, it could be interpreted to mean that a vehicle cannot transmit a signal while receiving a signal.

Such a half-duplex problem may continuously cause collisions. That is, in case vehicles exchanges messages with each other in an arbitrary resource region, if a transmitting vehicle collides with a receiving vehicle in a specific resource region, other vehicles cannot recognize this collision, and thus it may cause continuous collisions. As one method for efficiently solving the problem, a short TTI can be used. That is, when a TTI temporally shorter than that used in the current LTE system is used and hopping is performed on such a short TTI, the continuous collisions can be prevented.

In addition, if V2V communication is performed using uplink resources due to an in-band emission problem, only partial frequency bands may be used, and it may cause performance degradation. Assuming that all frequency bands are used for V2V communication for the purposed of solving this problem, it may be efficient to design the short TTI in terms of resource utilization.

To design a short TTI, it can be considered to reduce the number of orthogonal frequency division multiplexing (OFDM) symbols consisting of the TTI. This could be interpreted as a scheme of dividing the TTI of the current LTE system. In this case, when the conventional format used in the LTE system and the short TTI are simultaneously transmitted and received, symbol boundaries therebetween are matched, and thus interference can be easily controlled.

To this end, details of a DMRS configuration applicable when the short TTI is designed will be described in the present invention.

First Embodiment

According to the first embodiment of the present invention, a method of applying/sharing a reference signal (RS) to/with a next adjacent TTI is premised on the TTI design. In this case, the shared RS in the next adjacent TTI can also be used for a next TTI. If the next adjacent TTI is transmitted by another transmitting UE, a space for automatic gain control (AGC) would be required in front of the shared RS.

Figure 10A:
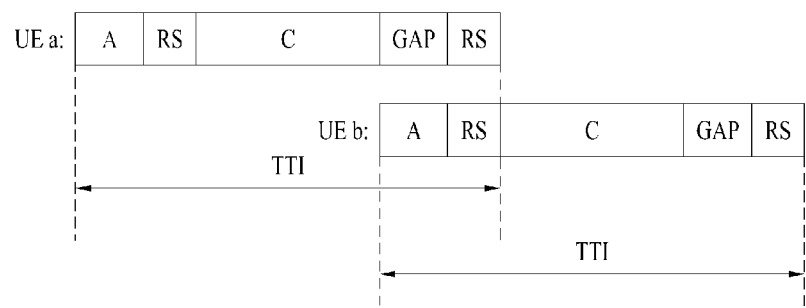
FIG. 10 illustrates a case in which a plurality of short TTIs according to the present invention overlap with each other.

FIG. 10 illustrates a TTI structure for explaining the first embodiment of the present invention. Referring to FIG. 10a, for example, AGC can be performed in the 'A' region, an RS can be transmitted in the 'RS' region, data can be transmitted in the 'C' region, and the 'GAP' region can be empty. If the 'A' region is used for the AGC, a known sequence or dummy (garbage) signal may be transmitted. Alternatively, an arbitrary known signal or a part of an RS may be allocated to the 'A' region. Further, part of data or a signal arbitrarily selected by a transmitting UE may be allocated to the 'A' region.

For example, it is assumed in FIG. 10a that UE a performs transmission using the first TTI and UE b performs transmission using the second TTI. In this case, the UE a empties the 'GAP' region, and the UE b transmits a signal for the AGC in a region corresponding to the GAP' region of the first TTI and the 'A' region of the second TTI. Alternatively, a known signal or a signal arbitrarily selected by the transmitting UE (e.g., UE b) may be transmitted in the 'GAP' region for the AGC of an overlapping RS.

Figure 10B:
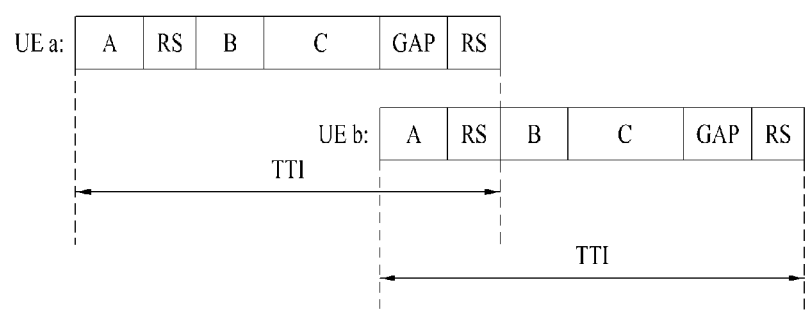

As another example, as shown in FIG. 10 b, the 'B' region can be additionally added to the structure of FIG. 10a. For example, when the transmitting UE performs transmission in the first TTI shown in FIG. 10b, an RS is shared, and thus it may cause the half-duplex problem that prevents an RS in a next TTI from being received. If channel estimation is performed using only the second RS in the second TTI without reception of the first RS in the second TTI, additional allocation for the AGC needs to be performed in front of the 'C' region. That is, the 'B' region can be added for the AGC as shown in FIG. 10b. A known signal or a part of an RS may be allocated to the 'B' region. Alternatively, part of data or a signal arbitrarily selected by the transmitting UE may be allocated to the 'B' region.

Referring to FIGS. 10a and 10b, the UEs a and b share one RS, and thus orthogonality or randomization for the RS would be required. Further, a case in which an uplink DM-RS sequence is used for such an RS will be described in the fourth and fifth embodiments of the present invention.

If a transmitting UE uses consecutive TTIs, the transmitting UE may use an overlapping region corresponding to, for example, the 'GAP' region of the first TTI and the 'A' region of the second TTI among the overlapping TTIs shown in FIGS. 10a and 10b for data transmission.

Hereinafter, embodiments in accordance with the current LTE structure and operations required for the uplink DM-RS design will be described based on the above discussion.

Second Embodiment

To implement a short TTI, the TTI of the current LTE system may be divided into two parts. Assuming that two columns of RS design is used for the short TTI as similar to the current LTE uplink DM-RS design, DM-RS overhead may be doubled compared to the current overhead.

To mitigate the doubled DM-RS overhead, a method for sharing some DM-RSs between individual short TTIs will be described in the second embodiment of the present invention. Basically, to enable a receiving end to perform AGC, the first symbol of the TTI may be used. The last symbol may be empty for TA. If a symbol or half-symbol of the TTI is used for the AGC, a known sequence or dummy (garbage) signal may be transmitted. In addition, the last symbol or half-symbol of the TTI may be empty for the TA instead of transmitting a signal therein.

Figure 11A:
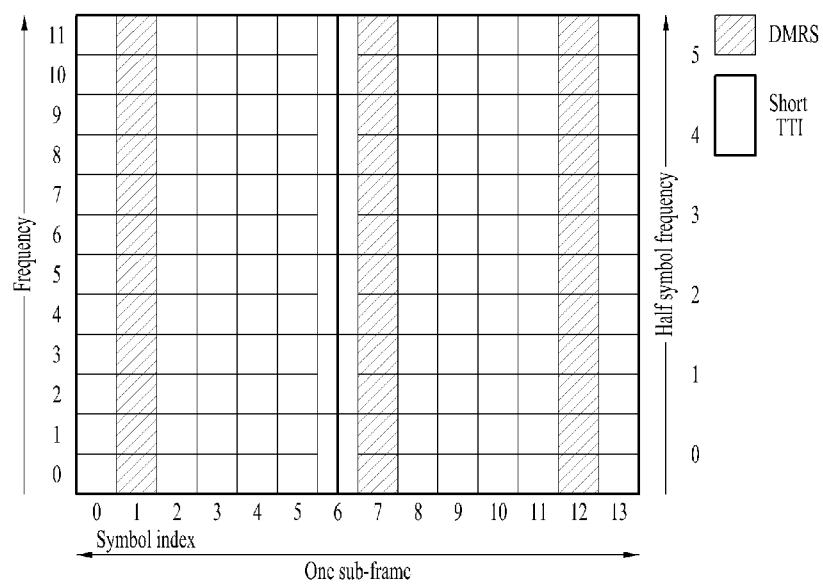
FIGS. 11 to 20 are diagrams for explaining reference signal configurations according to an embodiment of the present invention.

For example, the design may be implemented as shown in FIG. 11a. In FIG. 11a, an LTE TTI is divided into two short TTIs. The sixth OFDM symbol is divided into two half-symbols. The first one is used as the first short TTI, and the other one is used as the second short TTI. In this case, the first symbol of the first short TTI and the first half-symbol of the second short TTI are used for the AGC. In addition, the last half-symbol of the first short TTI is empty for the TA, and the last symbol of the second short TTI is also empty for the same reason.

Figure 11B:
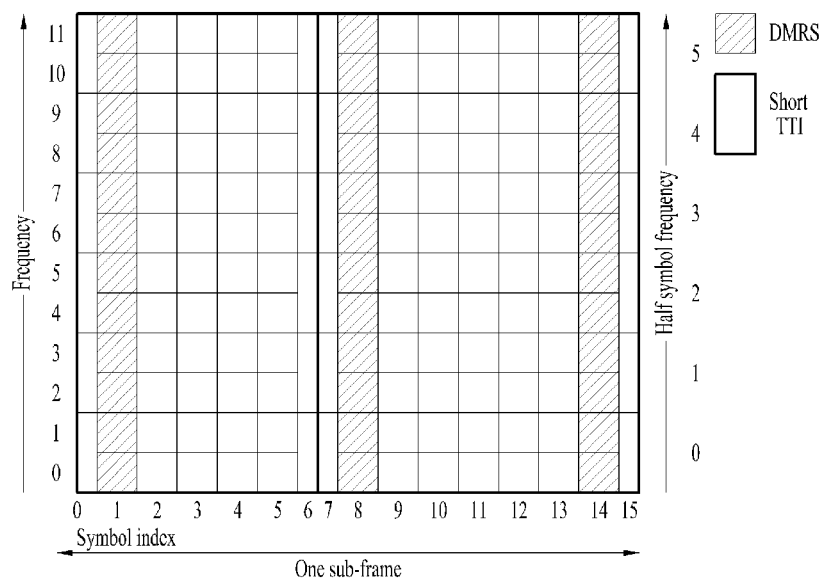
Figure 11C:
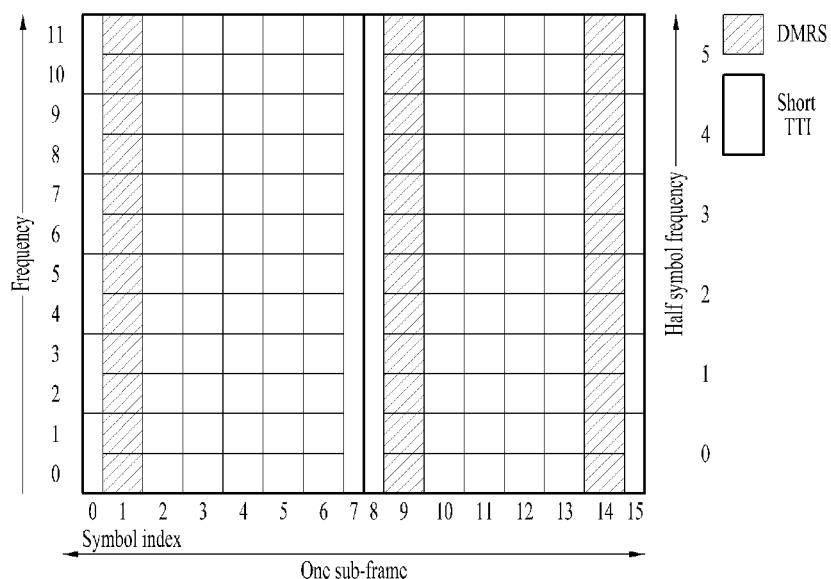

Alternatively, as shown in FIG. 11b or FIG. 11c, the first half-symbol of the first short TTI and the first half-symbol of the second short TTI may be used for the AGC. In addition, the last half-symbol of the first short TTI and the last half-symbol of the second short TTI may be empty for the TA.

In FIG. 11a, the second, third, fourth, and fifth symbols are used for data mapping in the first short TTI, and the eighth, ninth, tenth, and eleventh symbols are used for data mapping in the second short TTI. A DM-RS of the first symbol is used for the first short TTI, and a DM-RS of the twelfth symbol is used for the second short TTI. The seventh symbol is used for the first and second short TTIs. Thus, receiving UEs using the first short TTI perform channel estimation using DM-RSs of the first and seventh symbols, and receiving UEs using the second short TTI perform channel estimation using DM-RSs of the seventh and twelfth symbols.

In FIG. 11b, the second, third, fourth, and fifth symbols are used for data mapping in the first short TTI, and the ninth, tenth, eleventh, twelfth, and thirteenth symbols are used for data mapping in the second short TTI. A DM-RS of the first symbol is used for the first short TTI, and a DM-RS of the fourteenth symbol is used for the second short TTI. The eighth symbol is used for the first and second short TTIs. Thus, receiving UEs using the first short TTI perform channel estimation using DM-RSs of the first and eighth symbols, and receiving UEs using the second short TTI perform channel estimation using DM-RSs of the eighth and fourteenth symbols.

In FIG. 11c, the second, third, fourth, fifth, and sixth symbols are used for data mapping in the first short TTI, and the tenth, eleventh, twelfth, and thirteenth symbols are used for data mapping in the second short TTI. A DM-RS of the first symbol is used for the first short TTI, and a DM-RS of the fourteenth symbol is used for the second short TTI. The ninth symbol is used for the first and second short TTIs. Thus, receiving UEs using the first short TTI perform channel estimation using DM-RSs of the first and ninth symbol, and receiving UEs using the second short TTI perform channel estimation using DM-RSs of the ninth and fourteenth symbols.

Figure 12A:
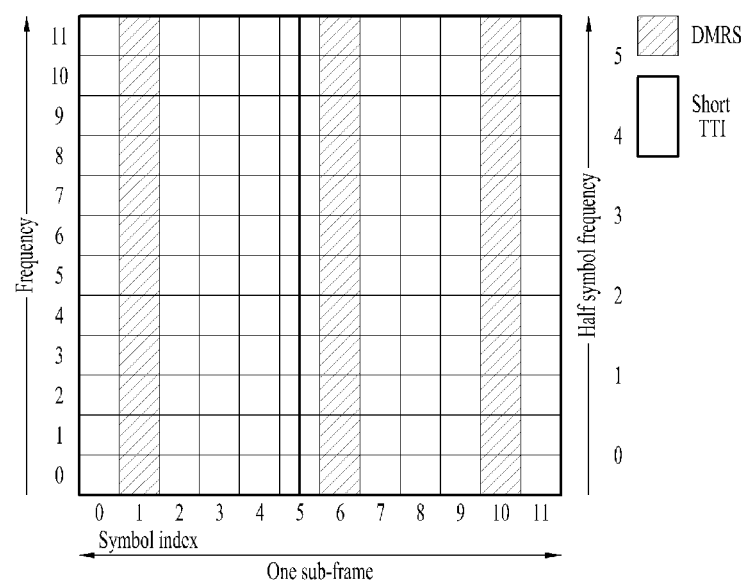
Figure 12B:
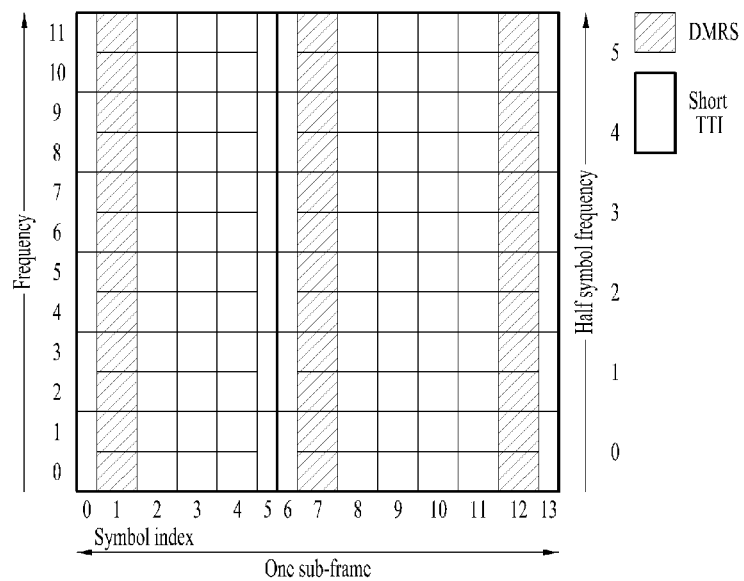
Figure 12C:
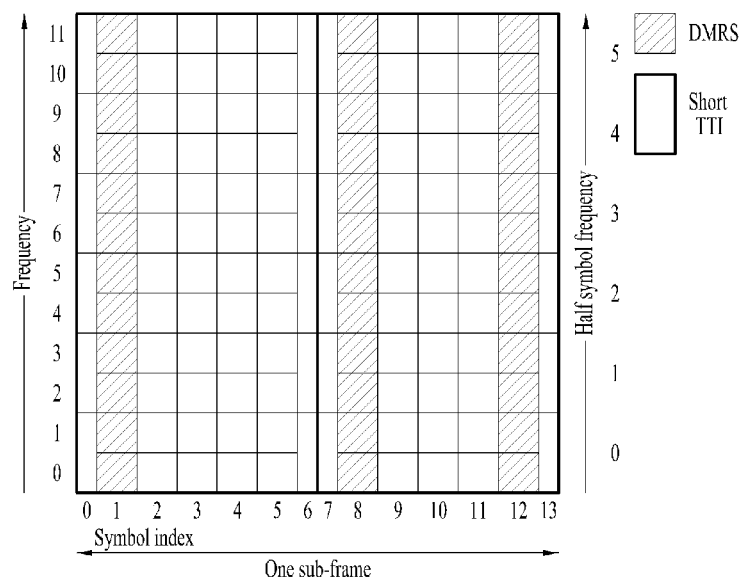

In the case of an extended CP, the design shown in FIGS. 11a, 11b, and 11c can be changed as shown in FIGS. 12a, 12b, and 12c respectively by eliminating one data symbol from each of the short TTIs.

When the design is implemented as shown in FIGS. 11a, 11b, and 11c, in a symbol immediately after an overlapping DM-RS, a DM-RS of the first short TTI may collide with a data symbol of the second short TTI. This problem may occur because signals arrives at different times due to different distances in V2V communication. For example, in the case of a transmitting UE that intends to transmit a message through the first short TTI in FIG. 11a, the transmitting UE performs the transmission using the seventh DM-RS, but it may invade the eighth symbol of a UE using the second short TTI.

Figure 13A:
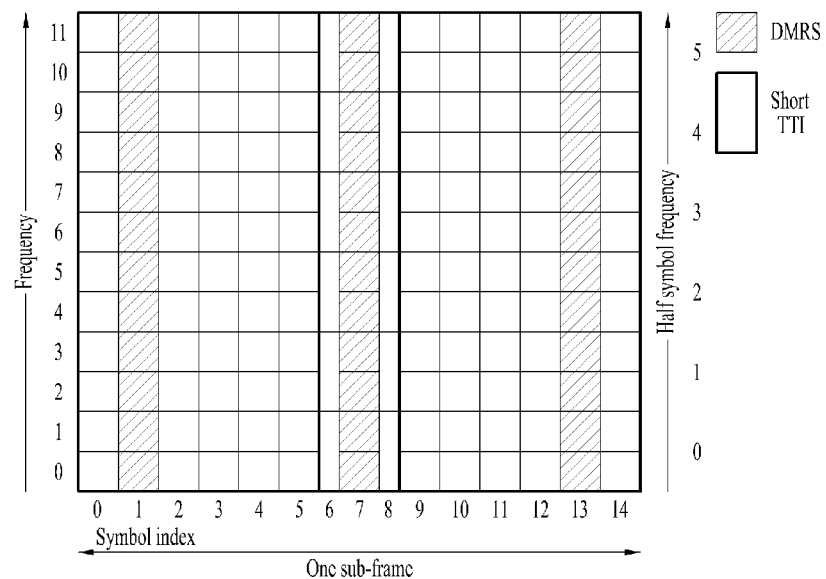

By considering this, the design may be implemented such that a symbol next to the overlapping DM-RS is empty as shown in FIG. 13a. In FIG. 13a, the first and second short TTIs may share the sixth, seventh, and eighth symbols. A transmitting UE using the first short TTI may empty the sixth and eighth symbols for the TA. In the second short TTI, the fourteenth symbol may be empty for the TA. In the first short TTI, the zeroth symbol may be used for the AGC and Tx/Rx switching time, and in the second short TTI, the sixth symbol may be used for the AGC and Tx/Rx switching time. In the second short TTI, the eighth symbol may be used for the AGC. The seventh DM-RS may be shared by different UEs that use the first and second short TTIs, respectively.

Figure 13B:
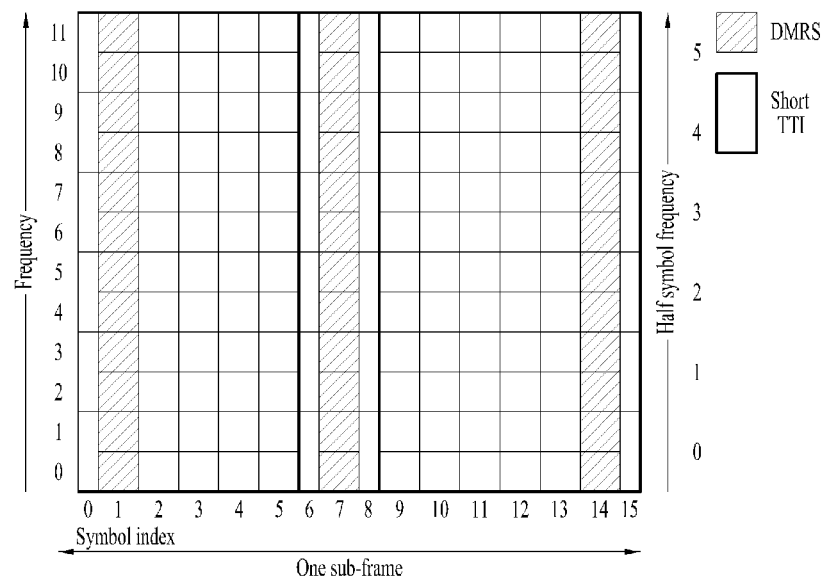
Figure 13C:
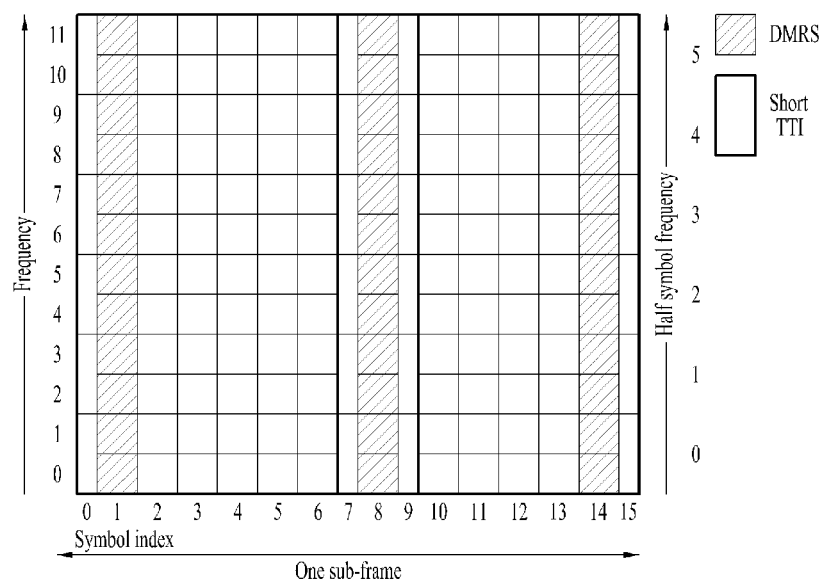

Alternatively, as shown in FIG. 13b or FIG. 13c, the first half-symbol of the first short TTI and the first half-symbol of the second short TTI may be used for the AGC. In addition, the last half-symbol of the first short TTI and the last half-symbol of the second short TTI may be empty for the TA.

In FIG. 13a, the second, third, fourth, and fifth symbols are used for data mapping in the first short TTI, and the ninth, tenth, eleventh, and twelfth symbols are used for data mapping in the second short TTI. A DM-RS of the first symbol is used for the first short TTI, and a DM-RS of the thirteenth symbol is used for the second short TTI. The seventh symbol is used for the first and second short TTIs. Thus, receiving UEs using the first short TTI perform channel estimation using DM-RSs of the first and seventh symbols, and receiving UEs using the second short TTI perform channel estimation using DM-RSs of the seventh and thirteenth symbols.

In FIG. 13b, the second, third, fourth, and fifth symbols are used for data mapping in the first short TTI, and the ninth, tenth, eleventh, twelfth, and thirteenth symbols are used for data mapping in the second short TTI. A DM-RS of the first symbol is used for the first short TTI, and a DM-RS of the fourteenth symbol is used for the second short TTI. The seventh symbol is used for the first and second short TTIs. Thus, receiving UEs using the first short TTI perform channel estimation using DM-RSs of the first and seventh symbols, and receiving UEs using the second short TTI perform channel estimation using DM-RSs of the seventh and fourteenth symbols.

In FIG. 13c, the second, third, fourth, fifth, and sixth symbols are used for data mapping in the first short TTI, and the tenth, eleventh, twelfth, and thirteenth symbols are used for data mapping in the second short TTI. A DM-RS of the first symbol is used for the first short TTI, and a DM-RS of the fourteenth symbol is used for the second short TTI. The eighth symbol is used for the first and second short TTIs. Thus, receiving UEs using the first short TTI perform channel estimation using DM-RSs of the first and eighth symbol, and receiving UEs using the second short TTI perform channel estimation using DM-RSs of the eighth and fourteenth symbols.

Figure 14A:
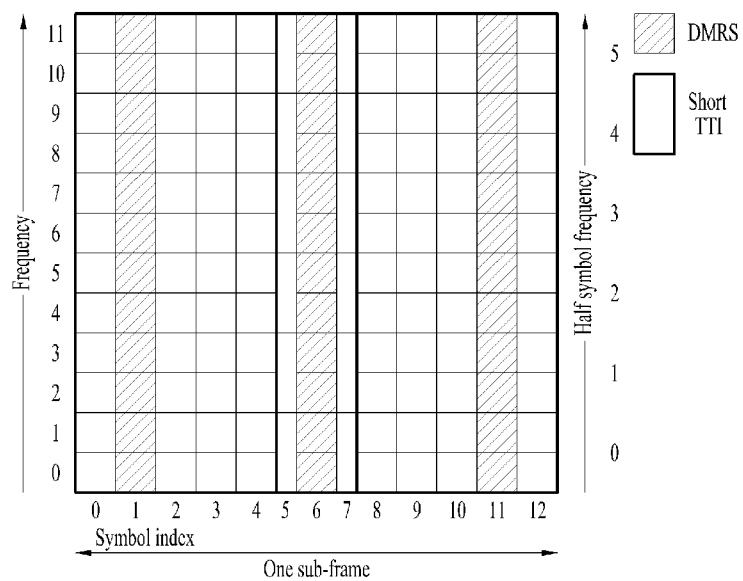
Figure 14B:
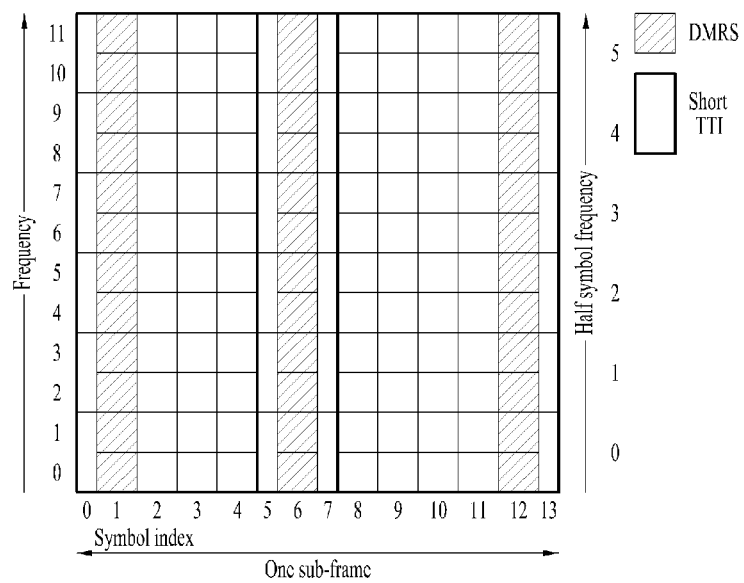
Figure 14C:
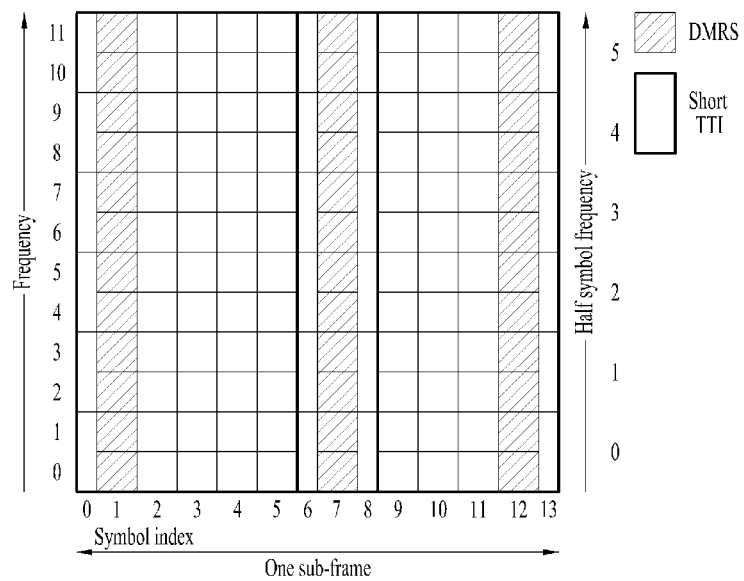

In the case of an extended CP, the design shown in FIGS. 13a, 13b, and 13c can be changed as shown in FIGS. 14a, 14b, and 14c respectively by eliminating one data symbol from each of the short TTIs.

Figure 15A:
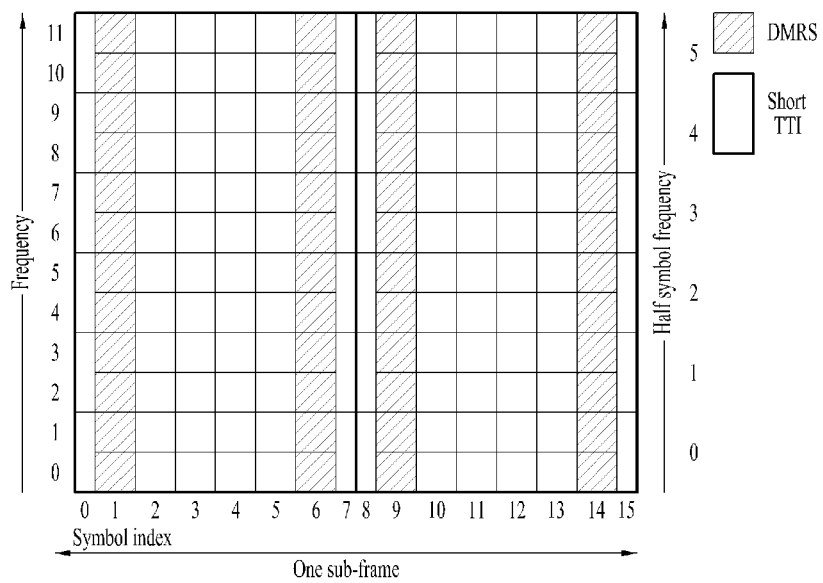

Alternatively, when one column of DM-RSs are further added as shown in FIG. 15a, the first and second short TTIs may share the sixth and ninth DM-RSs. That is, in FIG. 15a, if frequency offset is high, phase offset due to the high frequency offset can be adjusted using the sixth and ninth DM-RSs. In FIG. 15a, the zeroth and eighth symbols may be used for the AGC for the first and second short TTIs, respectively. In addition, the seventh and fifteenth symbols may be empty for the TA for the first and second short TTIs, respectively.

Figure 15B:
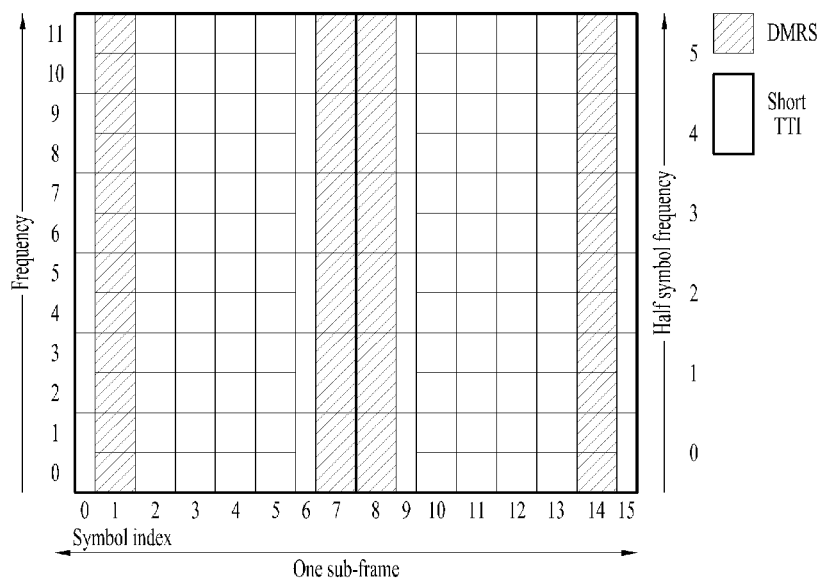

Alternatively, the design may be implemented as shown in FIG. 15b. In FIG. 15b, the zeroth and sixth symbols may be used for the AGC for the first and second short TTIs, respectively. In addition, the ninth and fifteenth symbols may be empty for the TA for the first and second short TTIs, respectively.

In FIG. 15a, the second, third, fourth, and fifth symbols are used for data mapping in the first short TTI, and the tenth, eleventh, twelfth, and thirteenth symbols are used for data mapping in the second short TTI. A DM-RS of the first symbol is used for the first short TTI, and a DM-RS of the fourteenth symbol is used for the second short TTI. The sixth and ninth symbols are used for the first and second short TTIs. Thus, receiving UEs using the first short TTI perform channel estimation using DM-RSs of the first, sixth, and ninth symbols, and receiving UEs using the second short TTI perform channel estimation using DM-RSs of the sixth, ninth, and fourteenth symbols.

In FIG. 15b, the second, third, fourth, and fifth symbols are used for data mapping in the first short TTI, and the tenth, eleventh, twelfth, and thirteenth symbols are used for data mapping in the second short TTI. A DM-RS of the first symbol is used for the first short TTI, and a DM-RS of the fourteenth symbol is used for the second short TTI. The seventh and eighth symbols are used for the first and second short TTIs. Thus, receiving UEs using the first short TTI perform channel estimation using DM-RSs of the first, seventh, and eighth symbols, and receiving UEs using the second short TTI perform channel estimation using DM-RSs of the seventh, eighth, and fourteenth symbols.

Figure 16A:
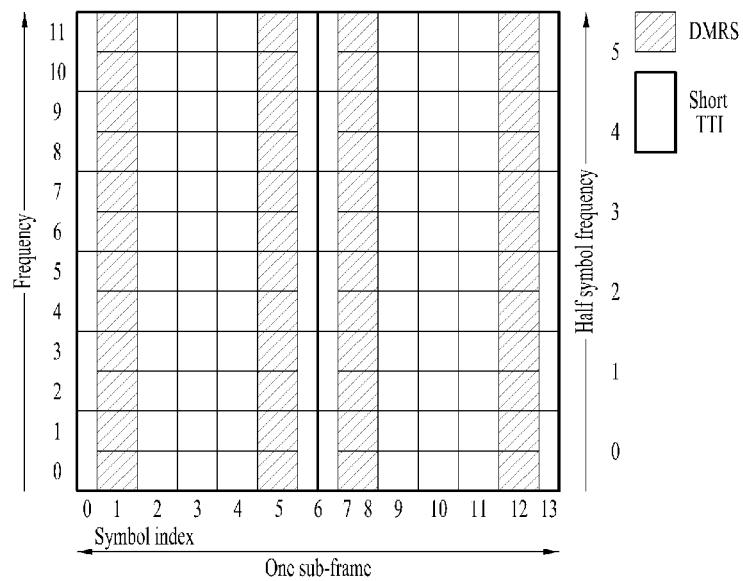
Figure 16B:
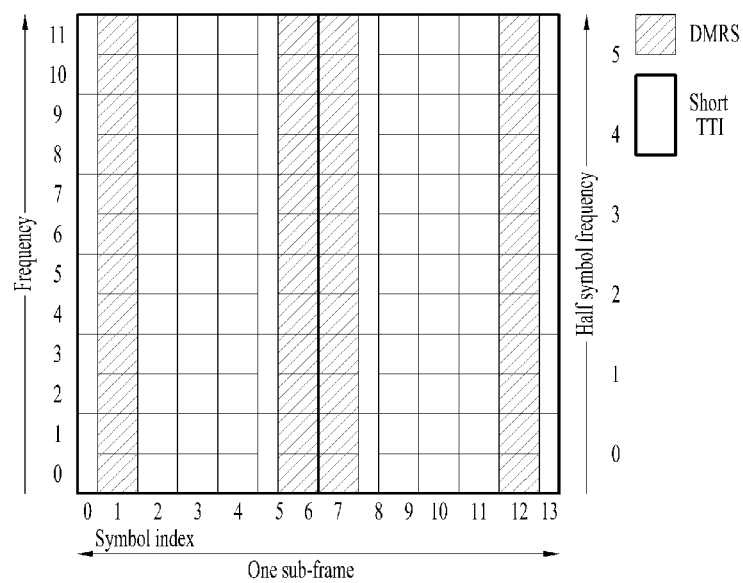

In the case of an extended CP, the design shown in FIGS. 15a and 15b can be changed as shown in FIGS. 16a and 16b respectively by eliminating one data symbol from each of the short TTIs.

Figure 17A:
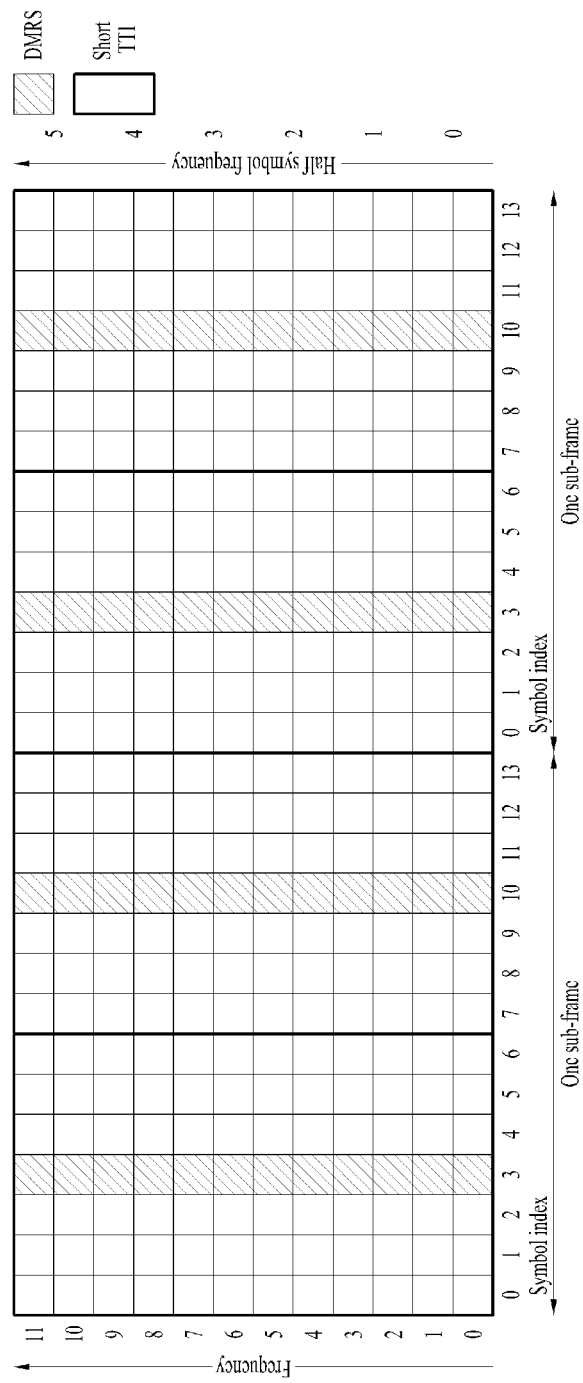
Figure 17B:
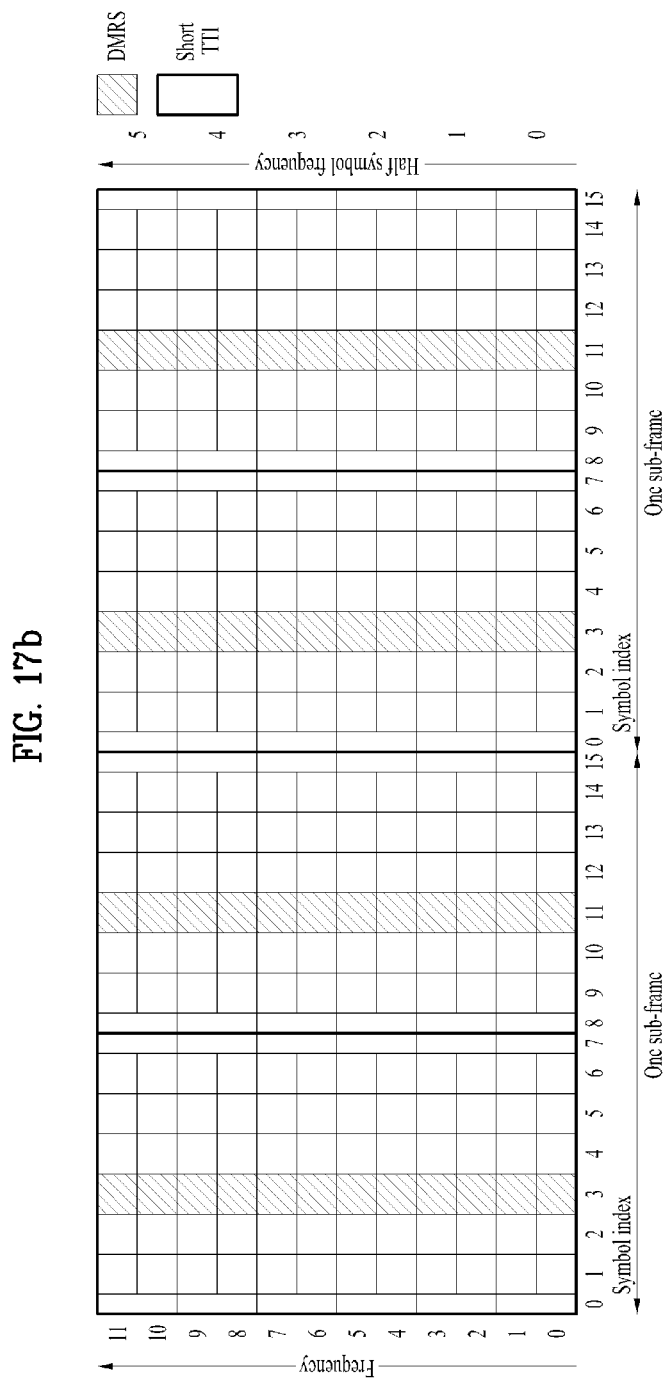

Alternatively, as shown in FIG. 17a, although the TTI of the current LTE system is divided into two parts, from the perspective of a specific short TTI, a DM-RS of a short TTI prior to the specific short TTI and a DM-RS of a short TTI next to the specific short TTI can be shared. For example, referring to FIG. 17a, for the second short TTI of the first subframe, the third and tenth DM-RSs of the first subframe and the third DM-RS of the second subframe may be used in channel estimation. Alternatively, the design may be implemented in consideration of the AGC and TA as shown in FIG. 17b. That is, referring to FIG. 17b, the zeroth and eighth symbols of the first subframe and the zeroth and eighth symbols of the second subframe may be used for the AGC of the first, second, third, and fourth short TTIs, respectively. In addition, the seventh and fifteenth symbols of the first subframe and the seventh and fifteenth symbols of the second subframe may be empty for the TA of the first, second, third, and fourth short TTIs, respectively.

In FIG. 17a, the zeroth, first, second, fourth, fifth, and sixth symbols of the first subframe are used for data mapping in the first short TTI, and the seventh, eighth, ninth, eleventh, twelfth, and thirteenth symbols of the first subframe are used for data mapping in the second short TTI. In addition, the zeroth, first, second, fourth, fifth, and sixth symbols of the second subframe are used for data mapping in the third short TTI, and the seventh, eighth, ninth, eleventh, twelfth, and thirteenth symbols of the second subframe are used for data mapping in the fourth short TTI. Each short TTI shares DM-RSs of two adjacent short TTIs. For example, in FIG. 17a, from the perspective of the second short TTI of the first subframe, the third and tenth DM-RSs of the first subframe and the third DM-RS of the second subframe may be used for the channel estimation. Thus, receiving UEs using the second short TTI use the third and tenth DM-RSs of the first subframe and the DM-RS of the third symbol of the second subframe for the channel estimation.

In FIG. 17b, the first, second, fourth, fifth, and sixth symbols of the first subframe are used for data mapping in the first short TTI, and the ninth, tenth, twelfth, thirteenth, and fourteenth symbols of the first subframe are used for data mapping in the second short TTI. In addition, the first, second, fourth, fifth, and sixth symbols of the second subframe are used for data mapping in the third short TTI, and the ninth, tenth, twelfth, thirteenth, and fourteenth symbols of the second subframe are used for data mapping in the fourth short TTI. Each short TTI shares DM-RSs of two adjacent short TTIs. For example, in FIG. 17b, from the perspective of the second short TTI of the first subframe, the third and eleventh DM-RSs of the first subframe and the third DM-RS of the second subframe may be used for the channel estimation. Thus, receiving UEs using the second short TTI use the third and eleventh DM-RSs of the first subframe and the DM-RS of the third symbol of the second subframe for the channel estimation.

Figure 18A:
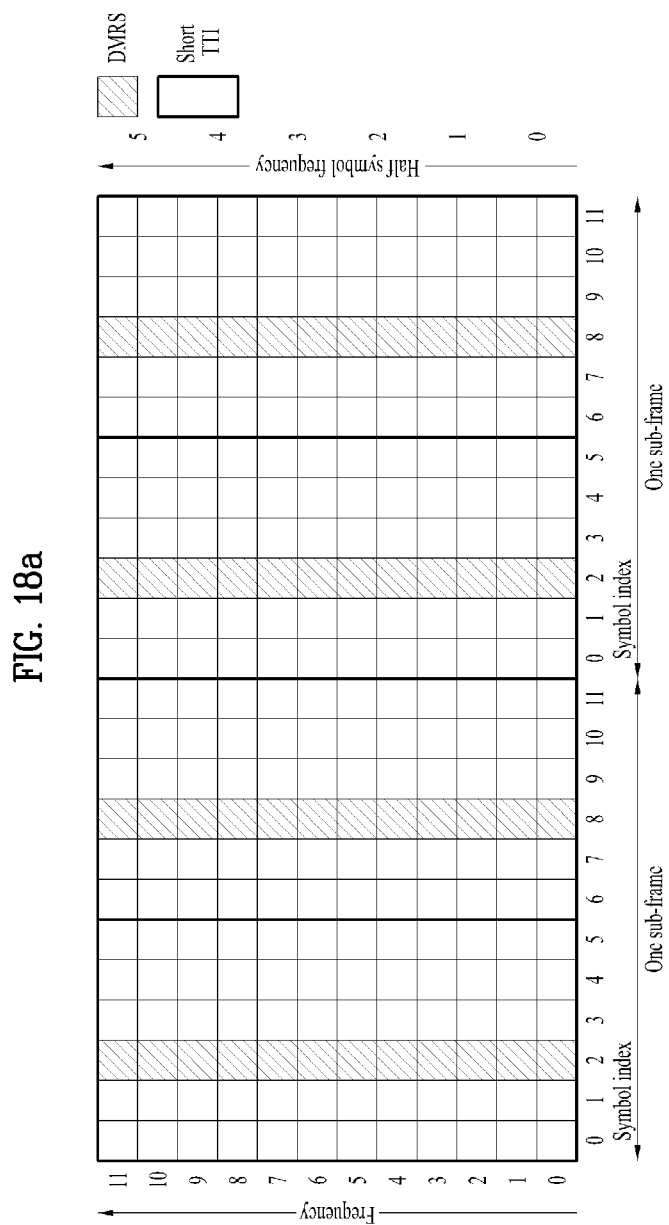
Figure 18B:
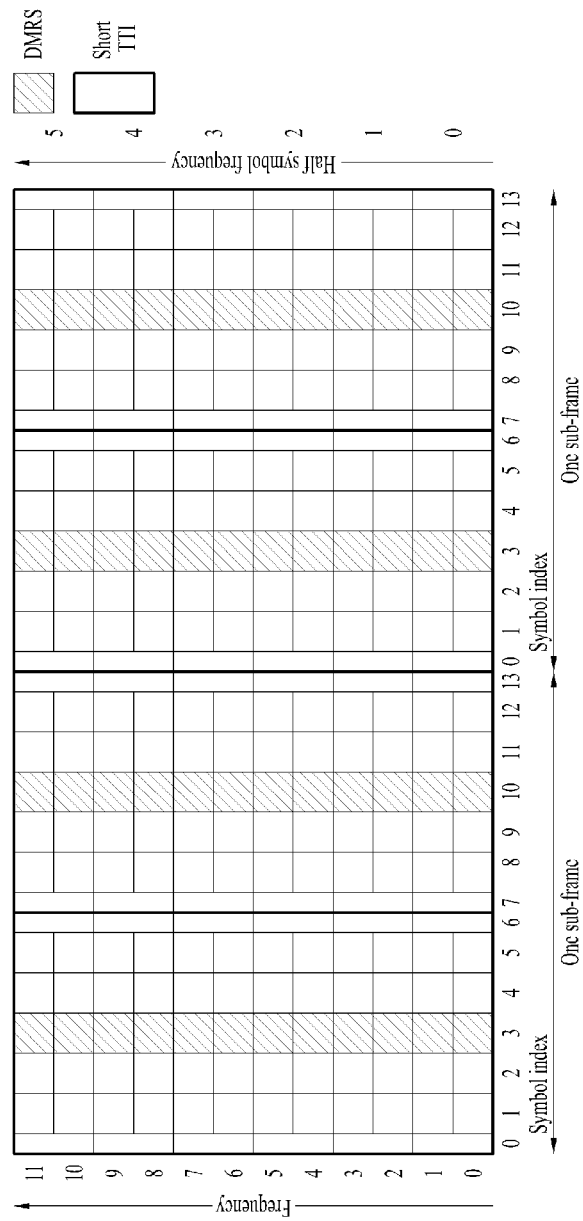

Further, in the case of an extended CP, the design shown in FIGS. 17a and 17b can be changed as shown in FIGS. 18a and 18b respectively by eliminating one data symbol from each of the short TTIs.

Third Embodiment

To implement a short TTI, the TTI of the current LTE system may be divided into four parts. Assuming that two columns of RS design is used for the short TTI as similar to the uplink DM-RS design of the current LTE system, DM-RS overhead may be increased by four times compared to that of the current LTE system. To mitigate the increased DM-RS overhead, a method for sharing some DM-RSs between individual short TTIs will be described in the present invention.

Basically, to enable a receiving end to perform AGC, the first symbol of the TTI may be used. The last symbol may be empty for TA. Alternatively, the last symbol of the short TTI may be used for the TA of the corresponding short TTI, and at the same time, it may be used for the AGC of the next short TTI. In this case, if a symbol or half-symbol of the TTI is used for the AGC, a known sequence or dummy (garbage) signal may be transmitted. In addition, the last symbol or half-symbol of the TTI may be empty for the TA instead of transmitting a signal therein.

Figure 19A:
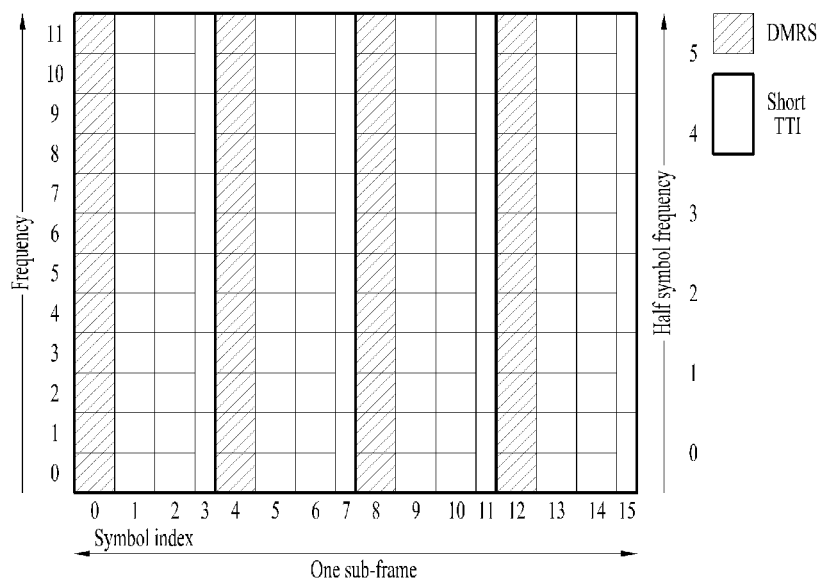

For example, the design may be implemented as shown in FIG. 19a. In FIG. 19a, an LTE TTI is divided into four short TTIs. Each of the third, seventh, eleventh, and fifteenth OFDM symbols is designed as a half-symbol, and the half-symbol is used for the TA of each short TTI and the AGC of the next short TTI. In FIG. 19a, the AGC for the first short TTI can be performed in the last symbol of the previous short TTI.

In FIG. 19a, the second, third, fourth, and fifth symbols are used for data mapping in the first short TTI, and the eighth, ninth, tenth, and eleventh symbols are used for data mapping in the second short TTI. A DM-RS of the first symbol is used for the first short TTI, and a DM-RS of the twelfth symbol is used for the second short TTI. The seventh symbol is used for the first and second short TTIs. Thus, receiving UEs using the first short TTI perform channel estimation using DM-RSs of the first and seventh symbols, and receiving UEs using the second short TTI perform channel estimation using DM-RSs of the seventh and twelfth symbols.

In FIG. 19a, although DM-RSs are allocated to the zeroth, fourth, eighth, and twelfth symbols, they may be allocated to the first, fifth, ninth, and thirteenth symbols or the second, sixth, tenth, and fourteenth symbols.

In FIG. 19a, the first and second symbols are used for data mapping in the first short TTI, and the fifth and sixth symbols are used for data mapping in the second short TTI. In addition, the ninth and tenth symbols are used for data mapping in the third short TTI, and the thirteenth and fourteenth symbols are used for data mapping in the fourth short TTI.

In the design shown in FIG. 19a, the following methods a to c can be used to share DM-RSs between short TTIs.
  Method a: A transmitting UE transmits DM-RSs of the short TTI and DM-RSs of the next short TTI.
  Method b: A transmitting UE transmits DM-RSs of the short TTI and DM-RSs of the previous short TTI.
  Method c: A transmitting UE transmits DM-RSs of the short TTI, DM-RSs of the previous short TTI, and DM-RSs of the next short TTI.

Referring to the method a, in FIG. 19a, a transmitting UE transmits the fourth and eighth DM-RSs in the second short TTI. Referring to the method b, in FIG. 19a, a transmitting UE transmits the zeroth and fourth DM-RSs in the second short TTI. Referring to the method c, in FIG. 19a, a transmitting transmits the zeroth, fourth, and eighth DM-RSs in the second short TTI.

This will be described again from the perspective of a receiving UE. Referring to the method a, in FIG. 19a, the receiving UE performs channel estimation using the fourth and eighth DM-RSs in the second short TTI for a channel of the second short TTI. Referring to the method b, in FIG. 19a, the receiving UE performs channel estimation using the zeroth and fourth DM-RSs in the second short TTI for a channel of the second short TTI. Referring to the method c, in FIG. 19a, the receiving UE performs channel estimation using the zeroth, fourth, and eighth DM-RSs in the second short TTI for a channel of the second short TTI.

Figure 19B:
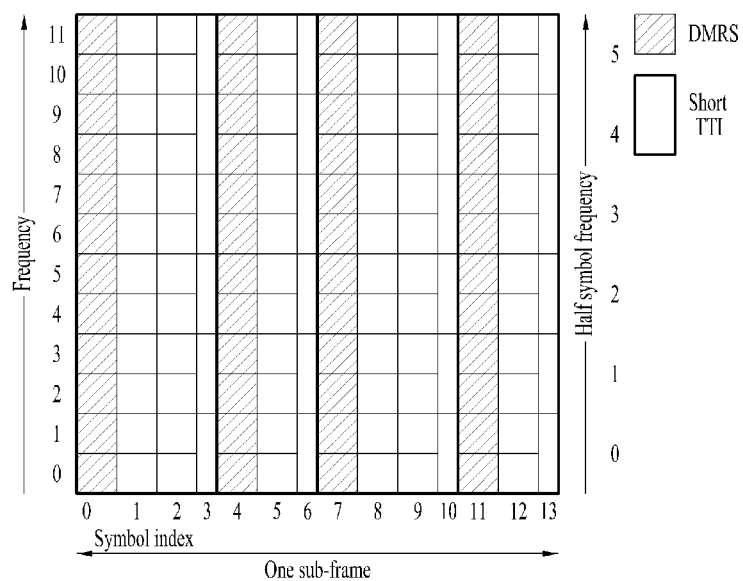

In the case of an extended CP, the design shown in FIG. 19a can be changed as shown in FIG. 19b by eliminating one data symbol from each of the second and fourth short TTIs. Alternatively, the design can also be changed by eliminating one data symbol from each of the first and third short TTIs.

When the design is implemented as shown in FIG. 19a, in a symbol immediately after an overlapping DM-RS, a DM-RS of a single short TTI may collide with a data symbol of the next short TTI. This problem may occur because signals arrives at different times due to different distances in V2V communication. For example, in the case of a transmitting UE that intends to transmit a message through the first short TTI in FIG. 19a, the transmitting UE performs the transmission using the fourth DM-RS, but it may invade the fifth symbol of a UE using the second short TTI.

Figure 20A:
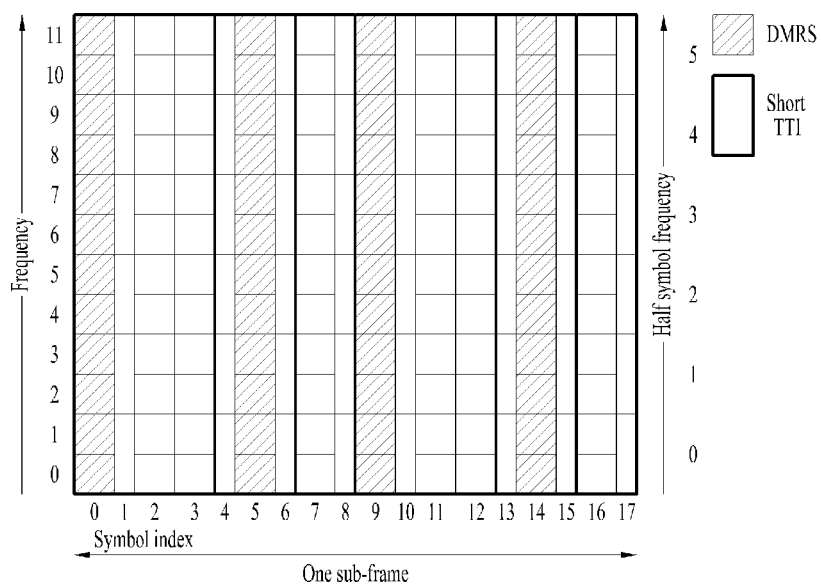

By considering this, the design may be implemented such that the next symbol of the overlapping DM-RS is empty as shown in FIG. 20a. In FIG. 20a, the first and second short TTIs may share the fourth, fifth, and sixth symbols. In addition, the third and fourth short TTIs may share the thirteenth, fourteenth, and fifteenth symbols.

In FIG. 20a, in the first short TTI, the fourth and sixth symbols may be empty for the TA. In the second short TTI, the eighth and tenth symbols may be empty for the TA. In the third short TTI, the thirteenth and fifteenth symbols may be empty for the TA. In the fourth short TTI, the seventeenth symbol may be empty for the TA. In addition, in the first short TTI, the seventeenth symbol of the previous subframe may be used for the AGC and Tx/Rx switching time, and the first symbol may be used for the AGC. In the second short TTI, the fourth symbol may be used for the AGC and Tx/Rx switching time, and the sixth symbol may be used for the AGC. In the third short TTI, the eighth symbol may be used for the AGC and Tx/Rx switching time, and the tenth symbol may be used for the AGC. In the fourth short TTI, the thirteenth symbol may be used for the AGC and Tx/Rx switching time, and the fifteenth symbol may be used for the AGC. Further, the seventh DM-RS may be shared by different UEs that use the first and second short TTIs, respectively.

Alternatively, as shown in FIG. 13b or FIG. 13c, the first half-symbol of the first short TTI and the first half-symbol of the second short TTI may be used for the AGC. In addition, the last half-symbol of the first short TTI and the last half-symbol of the second short TTI may be empty for the TA.

In FIG. 20a, the second and third are used for data mapping in the first short TTI, and the seventh symbol is used for data mapping in the second short TTI. In addition, the eleventh and twelfth symbols are used for data mapping in the third short TTI, and the sixteenth symbol is used for data mapping in the fourth short TTI. (For example, in FIG. 20a, the first and third short TTIs use two data symbols, and the second and fourth short TTIs use one data symbol. This may be designed such that the first short TTI is exchanged with the second short TTI and the third short TTI is exchanged with the fourth short TTI. By doing so, the first and third short TTIs may use one data symbol, and the second and fourth short TTIs may use two data symbols.) In the design shown in FIG. 20a, the following methods d to f can be used to share DM-RSs between short TTIs.
  Method d: A transmitting UE transmits DM-RSs of the short TTI and DM-RSs of the next short TTI.
  Method e: A transmitting UE transmits DM-RSs of the short TTI and DM-RSs of the previous short TTI.
  Method f: A transmitting UE transmits DM-RSs of the short TTI, DM-RSs of the previous short TTI, and DM-RSs of the next short TTI.

Referring to the method d, in FIG. 20a, a transmitting UE transmits the fifth and ninth DM-RSs in the second short TTI. Referring to the method e, in FIG. 20a, a transmitting UE transmits the zeroth and fifth DM-RSs in the second short TTI. Referring to the method f, in FIG. 20a, a transmitting transmits the zeroth, fifth, and ninth DM-RSs in the second short TTI.

This will be described again from the perspective of a receiving UE. Referring to the method d, in FIG. 20a, the receiving UE performs channel estimation using the fifth and ninth DM-RSs in the second short TTI for a channel of the second short TTI. Referring to the method e, in FIG. 20a, the receiving UE performs channel estimation using the zeroth and fifth DM-RSs in the second short TTI for a channel of the second short TTI. Referring to the method f, in FIG. 20a, the receiving UE performs channel estimation using the zeroth, fifth, and ninth DM-RSs in the second short TTI for a channel of the second short TTI.

Figure 20B:
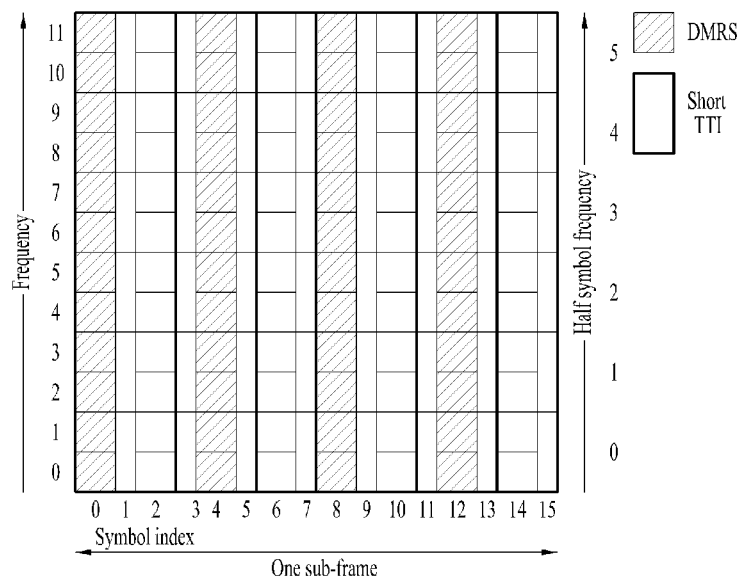

In the case of an extended CP, the design shown in FIG. 19a can be changed as shown in FIG. 20b by eliminating one data symbol from each of the first and third short TTIs.

Fourth Embodiment

In case the seventh symbol is simultaneously used as a DM-RS for the first and second short TTIs through overlapping as described with reference to FIG. 11, if different transmitting vehicles use the first and second short TTIs, the different vehicles are required to use different sequences for the DM-RS of the overlapping symbol for the purpose of facilitating the channel estimation.

First, the Zadoff-Chu sequence for a base sequence of a PUSCH DM-RS of the current LTE system will be described. The base sequence of the DM-RS is determined according to Equation 1.

Equation 1

$$x_q(m) = e^{-j\frac{\pi q m(m+1)}{N_{ZC}^{RS}}}, \quad 0 \le m \le N_{ZC}^{RS} - 1 \qquad \text{[Equation 1]}$$

In Equation 1, the value of q corresponding to a root value is determined according to Equation 2.

Equation 2

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \qquad \text{[Equation 2]}$$

In Equation 2, the value of u is determined according to Equation 3.

Equation 3

$$u = (f_{gh}(n_s) + f_{ss}) \bmod 30 \qquad \text{[Equation 3]}$$

In Equation 3, the value of $f_{gh}(n_s)$ is determined according to Equation 4.

Equation 4

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \qquad \text{[Equation 4]}$$

In Equation 4, the value of $c_{init}$ for c(i) is determined according to Equation 5.

Equation 5

$$c_{init} = \left\lfloor \frac{n_{ID}^{RS}}{30} \right\rfloor \qquad \text{[Equation 5]}$$

In Equation 5, the value of $n_{ID}^{RS}$ is determined by a cell ID or higher layer signaling. In Equation 3, the value of $f_{ss}$ is determined according to Equation 6.

Equation 6

$$f_{ss}^{PUSCH} = (N_{ID}^{cell} + \Delta_{ss}) \bmod 30 \qquad \text{[Equation 6]}$$

In Equation 6, $N_{ID}^{cell}$ indicates the value of the cell ID, and $\Delta_{ss}$ is a value transmitted from a higher layer. In Equation 2, the value of v is determined according to Equation 7.

Equation 7

$$v = \begin{cases} c(n_s) & \text{if group hopping is disabled and sequence hopping is enabled} \\ 0 & \text{otherwise} \end{cases} \qquad \text{[Equation 7]}$$

In Equation 7, the value of $c_{init}$ for c(i) is determined according to Equation 8.

Equation 8

$$c_{init} = \left\lfloor \frac{n_{ID}^{RS}}{30} \right\rfloor \cdot 2^5 + f_{ss}^{PUSCH} \qquad \text{[Equation 8]}$$

In Equation 8, the value of $n_{ID}^{RS}$ is determined by a cell ID or higher layer signaling. The value of $f_{ss}^{PUSCH}$ is determined according to Equation 6.

Therefore, according to the present invention, when the overlapping DM-RS is used for the first and second TTIs, Equations 1 to 8 can be modified according to the following modifications 1 to 8.

Modification 1: In Equation 5 or 8, the value of $n_{ID}^{RS}$ can be fixed to '510' or '511'. By doing so, transmitting UEs can use the same value for the base sequence, and a CS and OCC can have different values. Accordingly, the orthogonally overlapping DM-RS can be used.

Modification 2: In Equation 5 or 8, the value of $n_{ID}^{RS}$ can be set to an ID of a transmitting UE. By doing so, the base sequence can be randomized between transmitting UEs, and thus the overlapping DM-RS can be interference-randomized Modification 3: In Equation 5 or 8, the value of $n_{ID}^{RS}$ can be transmitted from an eNB to a transmitting UE through RRC signaling or a control channel. In this case, the transmitting UE can inform a receiving UE of the value of $n_{ID}^{RS}$ through a V2V control channel By doing so, the eNB can control the base sequence.

Modification 4: In Equation 3 or 4, the value of $n_s$ can be determined by a transmitting UE depending on how many DM-RSs including the overlapping DM-RS appear during its TTI in the time domain. For example, in FIG. 11a, when a UE uses the first short TTI, the value of $n_s$ for a DM-RS of the first symbol may be set to 0 and the value of $n_s$ for a DM-RS of the seventh symbol may be set to 1. Similarly, when a UE uses the second short TTI, the value of $n_s$ for a DM-RS of the seventh symbol may be set to 0 and the value of $n_s$ for a DM-RS of the twelfth symbol may be set to 1.

Modification 5: In Equation 3 or 4, $n_s$ can be set to have the same value for the overlapping DM-RS. For example, in FIG. 11a, when a UE uses the first short TTI, the value of $n_s$ for a DM-RS of the first symbol may be set to 0 and the value of $n_s$ for a DM-RS of the seventh symbol may be set to 1. Similarly, when a UE uses the second short TTI, the value of $n_s$ for a DM-RS of the seventh symbol may be set to 1 and the value of $n_s$ for a DM-RS of the twelfth symbol may be set to 0. By doing so, transmitting UEs can use the same value for the base sequence. In addition, a CS and OCC can have different values, and thus the overlapping DM-RS can be orthogonally used.

Modification 6: In Equation 6, the value of $N_{ID}^{cell}$ can be fixed to '510' or '511'. By doing so, transmitting UEs can use the same value for the base sequence. In addition, a CS and OCC can have different values, and thus the overlapping DM-RS can be orthogonally used.

Modification 7: In Equation 6, the value of $N_{ID}^{cell}$ can be set to an ID of a transmitting UE. By doing so, the base sequence can be randomized between transmitting UEs, and thus the overlapping DM-RS can be interference-randomized Modification 8: In the current LTE D2D communication, when a transmitting UE intends to transmit data or a control channel, the transmitting UE can transmit a specific pattern composed of a plurality of subframes. For example, four consecutive subframes may be transmitted as data. Similarly, in V2V communication, a specific pattern composed of a plurality of short TTIs can be transmitted. According to the present invention, when a sequence for the overlapping DM-RS is designed, a different base sequence may be used in each short TTI. To this end, information indicating how many short TTIs are present before a short TTI corresponding to the currently transmitted message in a pattern composed of a plurality of short TTIs can be reflected when a base sequence is generated. For example, when the value of $\Delta_{ss}$ is created, a value indicating how many short TTIs are present before the corresponding short TTI in the short TTI pattern may be reflected. Alternatively, when a sequence for the overlapping DM-RS is designed, a different base sequence may be used in each short TTI. To this end, $n_s$ can be designed to have the same value in each short TTI of the short TTI pattern.

Fifth Embodiment

When a cyclic shift (CS) and an orthogonal cover code (OCC) of the DM-RS are generated, a transmitting UE ID can be divided into several bits, and then the divided bits can be respectively allocated to the base sequence, CS, and OCC of the DM-RS. For example, in Equations related to the base sequence, which are used for the LTE PUSCH, $n_{ID}^{RS}$ or $N_{ID}^{cell}$ may be replaced with the transmitting UE ID. In this case, partial bits of the transmitting UE ID may be used to determine $n_{ID}^{RS}$ or $N_{ID}^{cell}$.

For example, if one of the two values 510 and 511 is used for $n_{ID}^{RS}$ or $N_{ID}^{cell}$, it may be determined using only one bit of a receiving UE ID (i.e., SA ID). In addition, in the case of the CS and OCC, since available numbers are limited, the CS may be determined using some of the remaining bits except the partial bits of the transmitting UE ID, which are used for the base sequence. Moreover, the OCC may be determined using some of the remaining bits except the partial bits of the transmitting UE ID, which are used for the base sequence and CS. For example, when the transmitting UE ID is implemented in the form of $$\underbrace{b_1 b_2 \ldots}_{a} \underbrace{b_n b_{n+1} \ldots}_{b} \underbrace{b_m b_{m+1} \ldots}_{c}$$

where $b_i$ has the value of '0' or '1', partial bits of the transmitting UE ID corresponding to the 'a' portion may be used to determine the value of $n_{ID}^{RS}$ or $N_{ID}^{cell}$ of the base sequence, partial bits corresponding to the 'b' portion may be used to determine the OCC of the DM-RS, and partial bits corresponding to the 'c' portion may be used to determine the CS of the DM-RS.

For example, more specifically, the transmitting UE ID may be divided into several portions, each of which is composed of several bits. Each of the several bits may be designated for each of the base sequence, CS, and OCC. That is, when the transmitting UE ID is implemented in the form of $$\underbrace{b_1 b_2 \ldots}_{a} \underbrace{b_n b_{n+1} \ldots}_{b} \underbrace{b_m b_{m+1} \ldots}_{c},$$

the 'a' portion may not be used, and the 'b' and 'c' portions may be used for the CS and OCC, respectively.

Alternatively, an eNB may inform a transmitting UE of the values of the CS and OCC through RRC signaling or a control channel. In this case, the transmitting UE can inform a receiving UE of the values of the CS and OCC through a V2V control channel By doing so, the eNB can control the values of the CS and OCC.

That is, in designing the short TTI according to the present invention, it is important to use orthogonal sequences or randomize sequences by properly adjusting base sequences, CSs, and OCCs of DM-RSs between transmitting UEs when the overlapping DM-RS is used. However, in some cases, the adjustment may not be achieved. Thus, according to the present invention, when the short TTI is used, an eNB may inform whether the overlapping DM-RS will be used. Such information may be transmitted from the eNB to a transmitting UE through RRC signaling or a control channel. In this case, the transmitting UE may transmit the related information to a receiving UE through a V2V control channel. Alternatively, a switching mode for DM-RS overlapping may be determined according to a carrier frequency.

Figure 21:
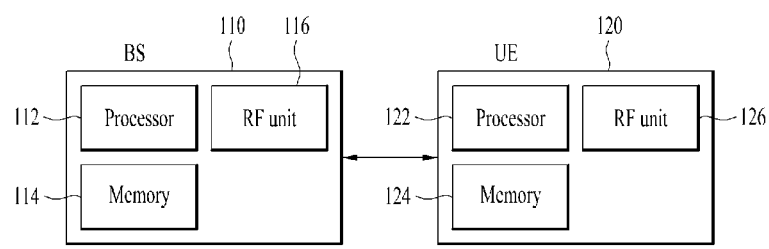
FIG. 21 illustrates a base station and a user equipment applicable to an embodiment of the present invention.

FIG. 21 illustrates a base station and a user equipment applicable to an embodiment of the present invention.

If a relay node is included in a wireless communication system, communication in a backhaul link is performed between the BS and the relay node and communication in an access link is performed between the relay node and the UE. Therefore, the BS or UE shown in the drawing can be substituted with the relay node in some cases.

Referring to FIG. 21, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

A method for configuring a reference signal for V2V communication in a wireless communication system and apparatus therefor can be applied to various wireless communication systems.

What is claimed is:

1. A method for receiving reference signals (RSs) for vehicle-to-vehicle (V2V) communication by a V2V device in a wireless communication system, the method comprising:
receiving a configuration for the RSs including at least one common RS for a first transmission time interval (TTI) and a second TTI following the first TTI; and
receiving the RSs according to the configuration,
wherein the first TTI and the second TTI are composed of orthogonal frequency division multiplexing (OFDM) symbols smaller than a subframe,
wherein symbol boundaries of the first TTI and the second TTI are configured to match symbol boundaries of the subframe,
wherein a first RS is transmitted in the first TTI, and a second RS and a third RS are transmitted in the second TTI,
wherein the first RS and the second RS are used to perform a channel estimation for the first TTI, and
wherein the second RS and the third RS are used to perform a channel estimation for the second TTI.

2. The method of claim 1, wherein, at least, a part of an OFDM symbol located at the front of each of the first TTI and the second TTI is configured for automatic gain control (AGC).

3. The method of claim 1, wherein, at least, a part of an OFDM symbol located at the end of each of the first TTI and the second TTI is configured for a timing advance (TA).

4. The method of claim 1, wherein an OFDM symbol next to the at least one common RS is configured to be empty.

5. The method of claim 1, wherein a fourth RS is included in the first TTI, and wherein the fourth RS is used to perform a channel estimation for the first TTI and the second TTI.

6. The method of claim 1, wherein the at least one common RS is configured to use different sequences for different V2V devices.

7. The method of claim 1, wherein the at least one common RS is generated using an identifier of another V2V device that transmits the RSs.

8. A vehicle-to-vehicle (V2V) device for receiving reference signals (RSs) for V2V communication in a wireless communication system, the V2V device comprising:
a receiver and transmitter; and
a processor, operatively coupled to the receiver and transmitter, wherein the processor is configured to:
control the receiver to receive a configuration for the RSs including at least one common RS for a first transmission time interval (TTI) and a second TTI following the first TTI; and
control the receiver to receive the RSs according to the configuration,
wherein the first TTI and the second TTI are composed of orthogonal frequency division multiplexing (OFDM) symbols smaller than a subframe, and
wherein symbol boundaries of the first TTI and the second TTI are configured to match symbol boundaries of the subframe,
wherein a first RS is transmitted in the first TTI, and a second RS and a third RS are transmitted in the second TTI,
wherein the first RS and the second RS are used to perform a channel estimation for the first TTI, and
wherein the second RS and the third RS are used to perform a channel estimation for the second TTI.

* * * * *